United States Patent
King et al.

(10) Patent No.: US 7,159,603 B2
(45) Date of Patent: Jan. 9, 2007

(54) MECHANICAL HOT TAPPING METHOD

(75) Inventors: Ralph E. King, Friendswood, TX (US); Charles R. Rutan, Rosharon, TX (US)

(73) Assignee: Equistar Chemicals, LP, Houston, TX (US)

(*) Notice: Subject to any disclaimer, the term of this patent is extended or adjusted under 35 U.S.C. 154(b) by 191 days.

(21) Appl. No.: 11/044,235

(22) Filed: Jan. 27, 2005

(65) Prior Publication Data

US 2006/0162773 A1 Jul. 27, 2006

(51) Int. Cl.
*F16L 41/04* (2006.01)
(52) U.S. Cl. ...................... 137/15.14; 137/318; 408/67
(58) Field of Classification Search ............. 137/15.14, 137/318; 408/67, 102, 137
See application file for complete search history.

(56) References Cited

U.S. PATENT DOCUMENTS 6,648,562 B1 * 11/2003 Calkins et al. ................ 408/67
6,655,406 B1 * 12/2003 Paddock ..................... 137/318

* cited by examiner

*Primary Examiner*—Kevin Lee
(74) *Attorney, Agent, or Firm*—Roderick W. MacDonald (57) ABSTRACT

A method of mechanically hot tapping petroleum equipment that contains a hydrocarbonaceous fluid in its interior by drilling an aperture in such equipment while employing cooling by cyclic drilling and/or refrigeration, the equipment drilling being carried out in a manner such that the temperature of the drill and material being drilled do not exceed a predetermined target temperature that is derived from the decomposition temperature, auto-ignition temperature, and like characteristics of the fluid present inside the equipment.

10 Claims, 7 Drawing Sheets

MECHANICAL HOT TAPPING METHOD

BACKGROUND OF THE INVENTION

1. Field of the Invention

This invention relates to hot tapping a piece of equipment which is in operation and contains a fluid material in the interior of that equipment. In particular, this invention relates to hot tapping such equipment by mechanical means with or without the use of a welding step.

2. Description of the Prior Art

Hot Tapping is a known, generic term and technique for creating an opening in piping, tanks, vessels, or other equipment (equipment) that is in operation, service, or use by drilling or otherwise cutting (drilling) an opening in that equipment. Often a branch fitting is attached during the hot tapping procedure. Hot tapping is desirably performed when it is not feasible or is impractical to take equipment out of service, or to purge or clean such equipment by conventional methods.

The American Petroleum Institute (API) has published written procedures directed to safe hot tapping practices in the downstream petroleum and oil processing industries. This API procedure is expressly limited to hot tapping by way of welding, and expressly excludes mechanical hot tapping because that form of hot tapping "is not common practice in oil processing and petroleum facilities".

In contrast, the instant invention is directed to mechanical hot tapping in downstream oil processing and petroleum industry applications. Thus, this invention eliminates hot tapping by welding that is so common in those industries without eliminating the function thereof, and replaces it with a safer mechanical method.

Although this invention is applicable to a very wide variety of equipment in the downstream oil processing and petrochemical industries (industries), for sake of clarity and brevity this invention will be described hereinafter in respect of an atmospheric storage tank (tank).

A common method at present for installing, for example, a nozzle on the roof of a conventional carbon steel tank for pressure relief or other purpose, involves removing the tank from service, and cleaning and decontaminating it to a level that will allow welding of the nozzle on to the roof of the tank. Due to the nature of the hydrocarbonaceous fluid material held in the interior of the tank, the expense of isolating and decontaminating the tank is considerable. With a tank the size of a conventional storage tank out of use, extensive operational adjustments in the facility where the tank resides must be made in terms, for example, of temporary piping and tanks-in-service, in order to allow the subject tank to be taken out of operation. Due to the nature of the decontamination work aforesaid, there may be a potential for an environmental impact and safety consequences from this cleaning activity.

This invention eliminates (1) the need for removing the subject tank from use, (2) the environmental and safety risks that may be associated with the decontamination of the tank, and (3) the disruption of facility and process operations, and consequent modifications made necessary by the tank being removed from service. The cost savings realized by eliminating the foregoing can run into the hundreds of thousands of dollars.

When dealing with a hydrocarbonaceous fluid, flammability is a constant concern. With a flammable liquid and its associated vapor, there are three conditions referred to as the fire triangle that must be present in order for a fire or explosion to occur. First, there must be a volume of flammable hydrocarbonaceous fluid available. Tanks in the industries heretofore mentioned have more than sufficient quantities of such fluids present in order to afford a potential hazard. Second, the fluid must have oxygen available for mixing in correct quantities with the fluid vapor to form a mixture that is within the flammable envelope. Air is usually present in the industries aforesaid. Last, there must be an ignition source (heat) in the area of the flammable mixture.

This invention controls in a robust and fault intolerant manner two of the three legs of the fire triangle. Since the material normally stored in the tank is inherently flammable, there is little that can be done, short of the conventional methods described hereinabove, to reduce or eliminate the first leg of the triangle. This invention focuses on the other two legs, oxygen and heat, to prevent ignition. In this invention no single step is used to control oxygen and heat. Rather, multiple, redundant actions are taken pursuant to this invention to ensure that if a single protective step proves inadequate, sufficient safeguards remain to prevent undesired ignition.

It is also desirable to accomplish hot tapping of equipment without causing thermal degradation of the material stored or carried within that equipment.

Accordingly, it is desirable to have in the industries aforesaid a mechanical method for hot tapping equipment without taking that equipment out of service and with minimal risk of undesired vapor ignition or inventory decomposition.

SUMMARY OF THE INVENTION

The method of this invention involves determining a target temperature for the structural area of the equipment from which a coupon is to be removed to provide the desired access to the interior of that equipment. This target temperature is the maximum temperature the equipment material in this structural area will be allowed to reach and not exceed during the hot tapping procedure. Thereafter the coupon is removed by the use of cyclic drilling of the structural material with or without the use of refrigeration and/or inert gas sweeping of such material in order not to exceed the target temperature during hot tapping and to minimize oxygen presence.

DETAILED DESCRIPTION OF THE INVENTION

Figure 1:
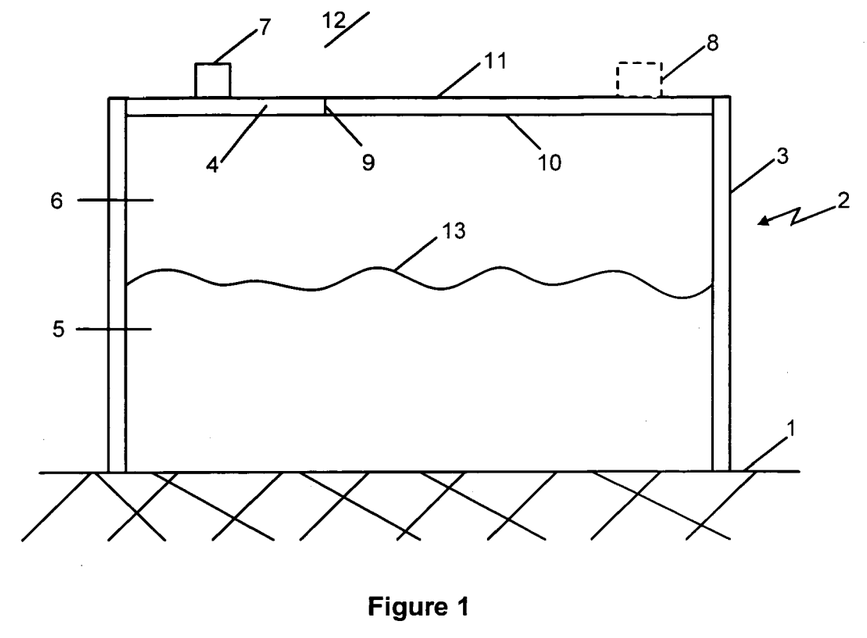
FIG. 1 shows a simplified, cross-sectional, plan view of an atmospheric hydrocarbon storage tank.

In accordance with this invention, FIG. 1 shows the earth's surface 1 carrying a carbon steel petroleum storage tank 2 that is surrounded on its outside by air and under normal atmospheric pressure. Tank 2 is composed, in its simplest form, of a round, upstanding side structure 3 surmounted by a fixed or floating roof structure 4. Such roof structure is fixed in FIG. 1. Roof 4 has an inner, lower side 10 that is exposed to the interior of the tank as defined by side 3 and roof 4, and an outer, upper side 11 that is exposed to the air that surrounds the exterior of tank side 3 and roof 4. The interior of tank 2 contains a hydrocarbonaceous liquid 3 whose upper surface 13 is spaced below inner surface 10 of roof 4 thereby providing a vapor space 6 that contains hydrocarbons in gaseous form. Vapor space 6 can contain not only hydrocarbon vapors, but, in many instances, quantities of air.

Roof 4 carries a vent 7, this vent having been fixed to roof 4 when tank 2 was constructed and before it was put into use by pumping liquid 5 into its interior. For the sake of a straight forward description of this invention it is assumed that a second vent 8, like vent 7, is desired to be fixed to roof 2 to provide additional venting capacity for the tank in case of an emergency or other operational need.

Although this description is directed for clarity to a carbon steel tank, this invention can be applied to a wide variety of materials from which tanks and other equipment in the aforesaid industries are formed, for example, stainless steel, aluminum, plastic, and the like. Similarly, liquid 5 can be any sort of flammable hydrocarbonaceous material, including, but not limited to, crude oil and any of the hydrocarbonaceous fractions recovered from crude oil and processed in a refinery, olefin plant, or other petroleum or hydrocarbon processing facility. Liquid 5 can also be a material whose vapor is subject to thermal decomposition or degradation.

Figure 2:
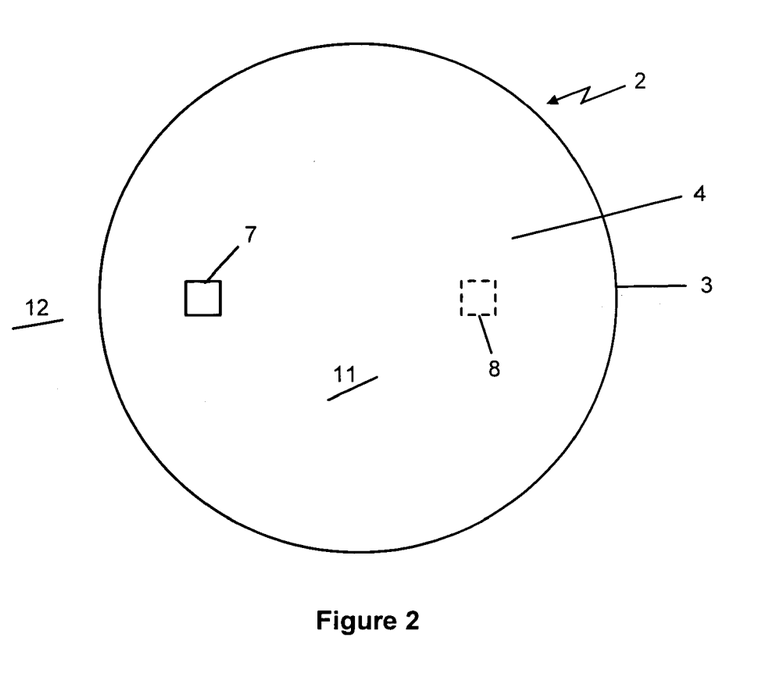
FIG. 2 shows the top of the tank of FIG. 1.

FIG. 2 shows the top of tank 2 with its current vent 7 and the desired spaced apart vent 8 that is to be attached to roof 4 by way of a mechanical hot tapping procedure.

Figure 3:
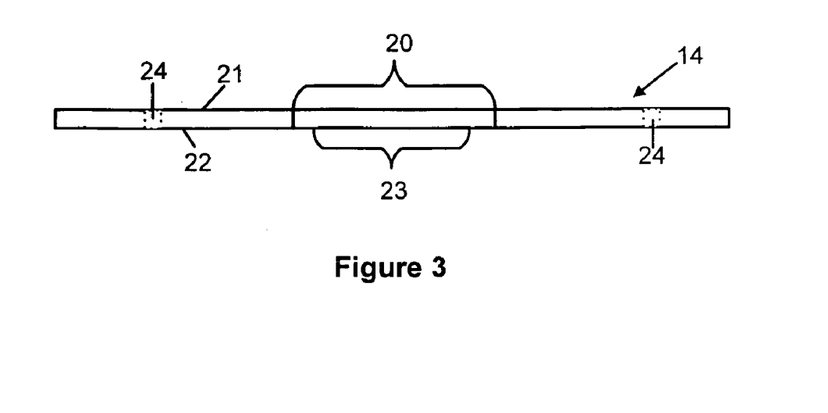
FIG. 3 shows a side view of a template that can be employed in the method of the invention.

A common method for adding a vent such as vent 8 to a tank roof is to fix a flange to the roof and then mount the new vent means 8 to that flange. A conventional flange is, as discussed hereafter in FIG. 6, a section of hollow conduit with laterally extending flange members at either end for receiving a plurality of fasteners such as mechanical bolts. Often a template is employed in order to mark the locations where the bolt holes are to be drilled in the roof in a pattern that mates with the bolt holes in one of the flange members. FIG. 3 shows a side view of such a template 14.

Template 14 is a section of material, usually metal, that has an aperture 20 there through from top surface 21 to bottom surface 22. Aperture 20 is chosen so as to accommodate the coupon cutting mechanism described hereinafter and, therefore, is larger in area than the area 23 of the coupon that is to be removed from the structural material that forms roof 4 in order to provide fluid communication between the interior of tank 2 and new vent 8. Around the periphery of aperture 20 of the template a plurality of spaced apart bolt holes 24 is provided, each hole extending from top 21 to bottom 22 of the template. Holes 24 are sized in their diameters to receive and pass temporary bolts and permanent bolts used in the hot tapping procedure of this invention.

Figure 4:
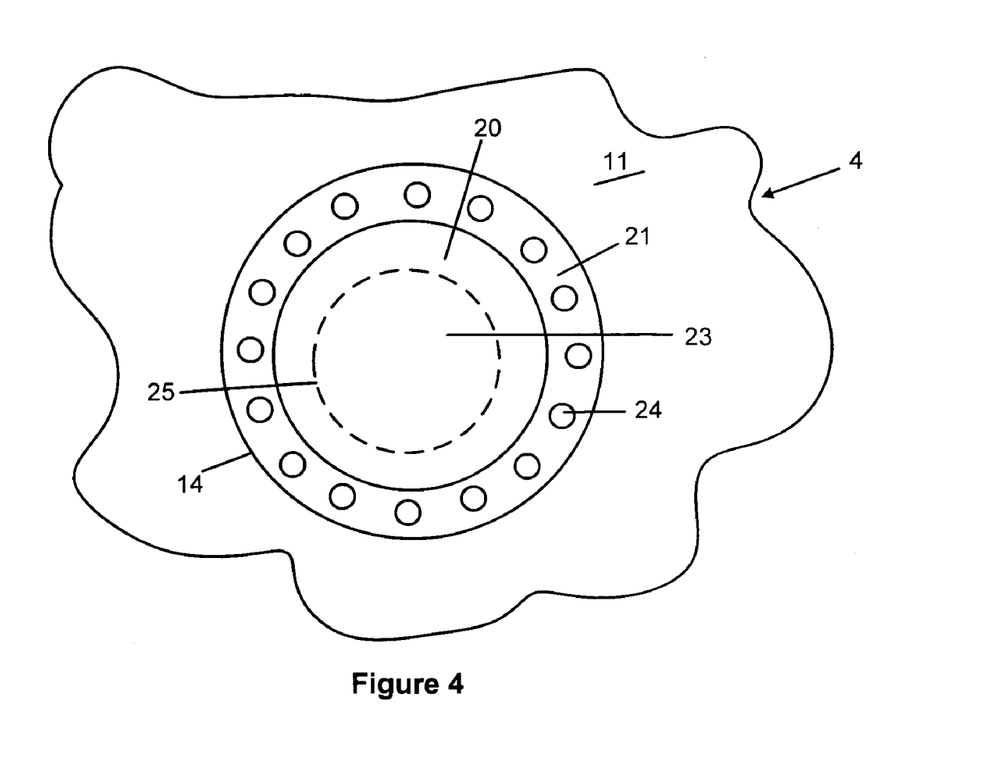
FIG. 4 shows a top view of the template of FIG. 3 when in place on the roof of the tank of FIG. 1.

FIG. 4 shows template 14 in place on top 11 of roof 4. Coupon area 23 is delineated in this Figure by dotted line 25. Dotted line 25 is, for sake of clarity, shown to be further removed from template 14 than would be the case in actual practice. After template 14 has been placed on roof 4 in the location desired for vent 8, holes are drilled through the structural material of roof 4 in each of holes 24 of the template, and this is when this invention first comes into play.

The composition of the structural material from which roof 4 is composed is known, as is the composition of the liquid 5 contained in the tank. With this knowledge, and with the aid of tests in a laboratory or other facility on fragments having the same structural material composition as that of the tank roof, one skilled in the art can readily determine by means of conventional infrared thermography a target temperature which the inner surface 10 of roof 4 will not be allowed to exceed during the drilling in roof 11 of holes 24 and the desired coupon. Suitable thermography equipment is commercially available from various suppliers, e.g., Infrared Solutions, Inc., and Electrophysics Corp. Inc.

This target temperature can vary widely depending on the compositions of the roof material that composes roof 4 and the contained liquid 5, but will generally be about half or less of the threshold temperature of liquid 5. Such threshold temperature can be the temperature at which liquid 5 thermally decomposes, auto-ignites, and the like. For example, the target temperature for ethylene decomposition can be about 400° F. or less, and for olefin plant pyrolysis gasoline auto-ignition can be about 150° F. or less.

Once the target temperature is determined, a cyclic drilling scheme is devised by trial and error drilling in a mock up test facility using a metal segment that is of essentially the same chemical composition as that of roof 4. In the test facility it is determined how long a drill can be operated to drill out the material of roof 4 without exceeding the predetermined target temperature of that material, and how long one must wait after terminating drilling to allow the material to cool sufficiently so that drilling can be resumed and maintained for another drilling period of the same or different duration, as desired. Thus, a procedure is devised for the particular composition of roof 4 and contents 5 for a sequence of drilling periods interspersed with periods of non-drilling for cooling purposes, until a hole is drilled through the full thickness 9 of roof 4 without exceeding the predetermined target temperature. This is cyclic drilling pursuant to this invention.

Cyclic drilling can be employed by itself in this invention in order to stay below the predetermined target temperature. However, if desired for any of a number of reasons such as speed of drilling, the area of roof 4 where drilling is carried out can be refrigerated to help keep the material of roof 4 that is being drilled below the target temperature. This can be accomplished by use of a coolant liquid or gas. Gases are favored in order to minimize the possibility of the coolant reaching the interior of tank 2 and contaminating liquid 5. Suitable coolants include liquid nitrogen, argon, ammonia, freon or any other fluid that creates a refrigerant effect on the material from which roof 4 is composed. When employing certain refrigerants, e.g., liquid nitrogen, a liquid drill bit lubricant can be employed with or without an antifreeze additive for the lubricant.

A refrigerant sweep across the area being drilled reduces, if not eliminates, the amount of air present at the precise spot of drilling and, therefore, addresses the second leg of the fire triangle. In addition an inert gas such as nitrogen can be swept through the vapor space below the tank roof and above the liquid level in the tank to prevent air intrusion below the roof during drilling. This way the area of drilling both above and below the tank roof can be at least reduced, if not eliminated, in oxygen content. The use of cyclic drilling and/or refrigeration to control temperature can be used with welded or mechanical attachments. For example, a fitting could be welded on to a vessel by controlling the welding heat input or while the vessel is empty or otherwise de-inventoried, and then hot tapped by drilling using cyclic and/or refrigerant cooling, e.g., during or after vessel refilling.

Figure 5:
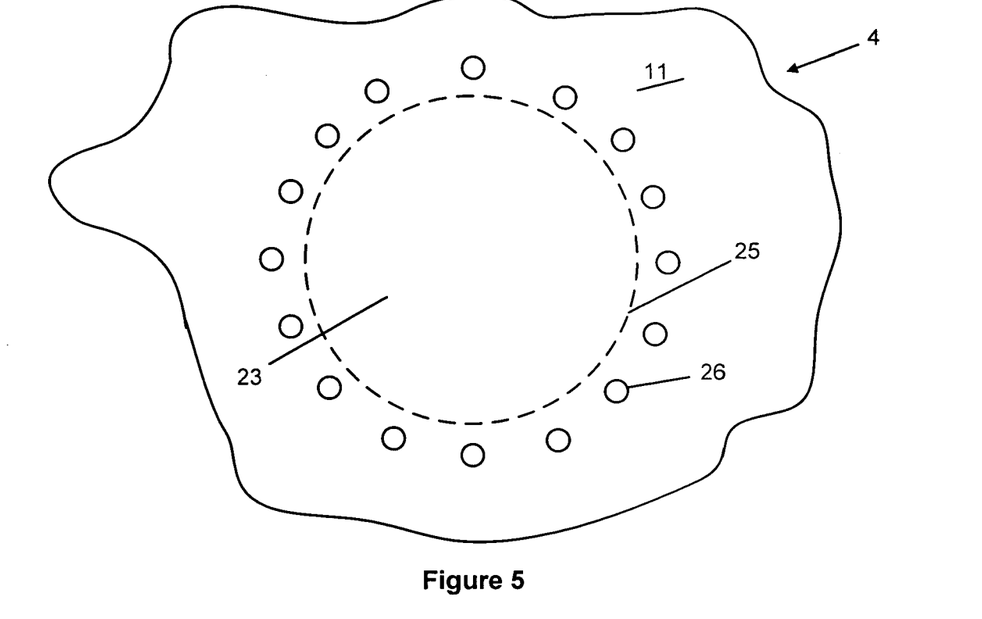
FIG. 5 shows the holes drilled in the tank roof after removal of the template of FIG. 4.

With the aid of template 14, holes are drilled through roof 4 using the cyclic drilling sequence described above with or without drill bit refrigeration and gas sweeping as aforesaid. Vaporous and/or liquid refrigerant can be applied directly to the area to be drilled since this drilling is not carried out in an enclosure like the coupon drilling disclosed hereinafter. After this drilling is accomplished, template 14 is removed leaving, as shown in FIG. 5, a series of holes 26 through the thickness 9 of roof 4. Holes 26 surround the area 23 of roof 4 from which it is desired to remove a coupon of material, and thereby provide fluid communication between the interior of tank 2 and its exterior above outer surface 11 of roof 4. Holes 26 are drilled with a non-sparking drill such as those powered by pneumatics or hydraulics.

Figure 6:
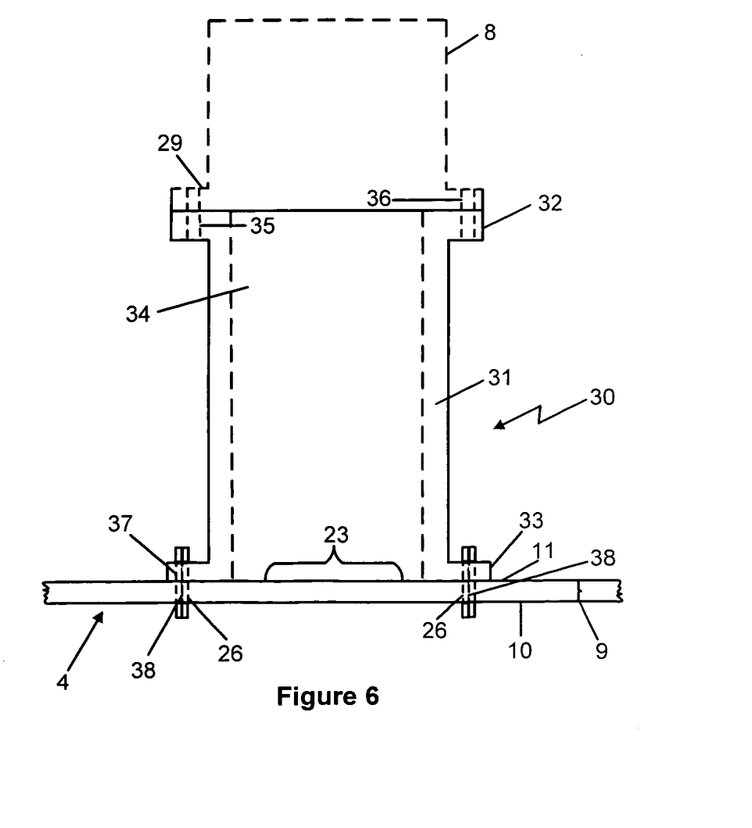
FIG. 6 shows a side view of a flange temporarily attached to the tank roof by means of removable mechanical fasteners.

FIG. 6 shows roof 4 after drilling of holes 26 and removal of template 14. In place of template 14, there has been placed on surface 11 a flange 30 with a conventional gasket material between the flange and roof top. Flange 30 is composed of a hollow, upstanding body 31 carrying at its upper and lower ends laterally extending flange members 32 and 33, respectively. The open interior 34 of flange 30 extends for the full length thereof so that after removal of a coupon (see FIG. 14) from roof 4, vent 8 is provided with fluid communication with the interior of tank 2 by way of interior 34. Vent 8 is shown in dotted lines because it would not be put in place on flange 30 at this stage of the hot tapping procedure since a coupon has not yet been removed from the tank roof. This is just a convenient time to show how vent 8 will ultimately be mated with flange 30 after the hot tapping procedure is completed.

Members 32 and 33 of flange 30 extend around the full periphery of flange body 31. Member 32 carries a plurality of spaced apart holes 35 that mate with similar holes 36 in flange member 29 of vent 8 whereby vent 8 can be secured to flange 30 by bolts or other desired mechanical fasteners. Similarly, member 33 carries a series of spaced apart bolt holes 37 whose spaced apart sequence mates with holes 26 in roof 4 so that flange 30 can be fixed to roof 4 by temporary mechanical fasteners 38.

Figure 7:
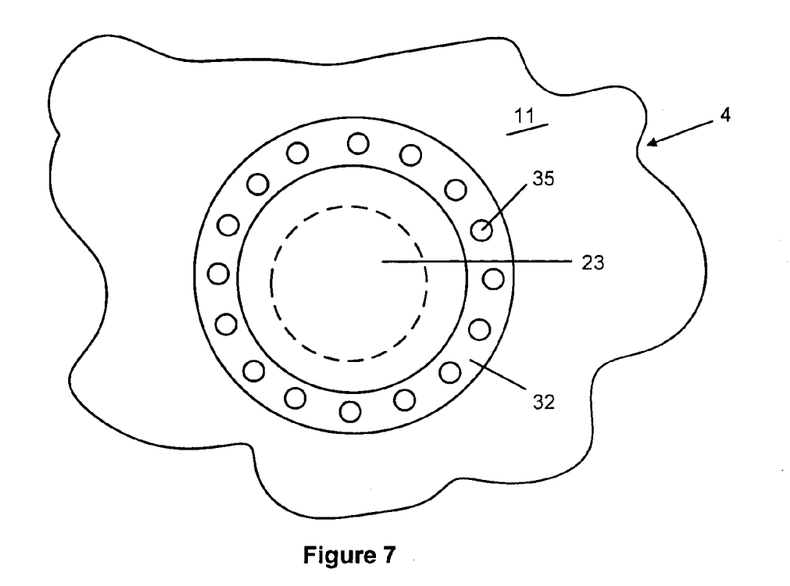
FIG. 7 shows a top view of FIG. 6.
Figure 8:
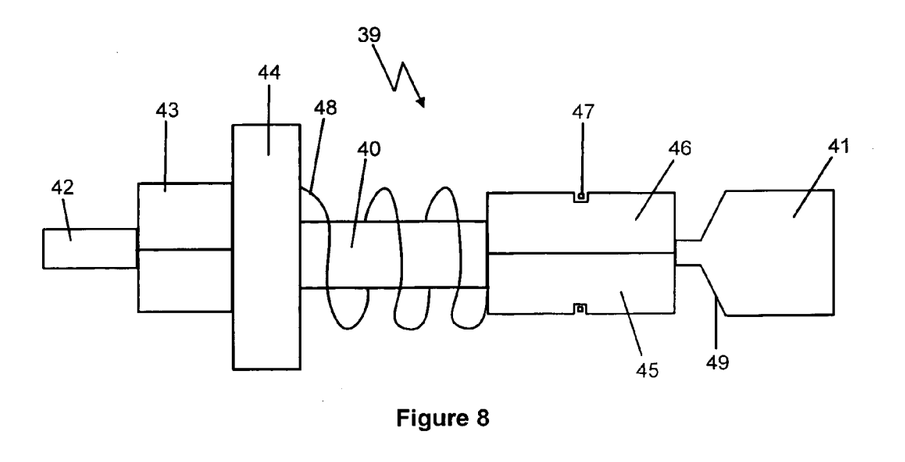
FIG. 8 shows a side view of one temporary fastener that can be employed in the process of this invention.

FIG. 7 is a top view of FIG. 8 and shows the circular nature of flange 30, and member 32, member 33 having a similar circular configuration.

Until the coupon is removed from roof 4 (FIG. 14) thereby allowing easy access to the inner surface 10 of roof 4 for the installation of permanent fasteners, temporary fasteners such as toggle bolts or the bolt shown in FIG. 8 can be employed in holes 26 and 37 to keep flange 30 in its desired location on roof 4. Temporary bolts can also be used to keep template 14 in place after the first few of holes 26 are drilled using template 14.

FIG. 8 shows a suitable temporary bolt 39 having a threaded (not shown) body 40 that extends from a flared end 41 to opposing rectangular end 42. Internally threaded nut 43 and its unthreaded washer 44 are carried in threadably engaged manner to body 40 near end 42. Adjacent end 41 separate, mating pieces 45 and 46 are carried about body 40 and held in place about body 40 by means of a spring or other resilient means such as an O-ring 47. Washer 44 and pieces 45 and 46 are held in spaced apart relation by a spring which is biased to maintain such relation. In operation, bolt 39 is inserted into a hole 26 with washer 44 resting on top of template 14 or member 33, as the case may be. Nut 43 is held in place and end 42 turned thus turning body 40 and pulling end 41 toward washer 44 against the normal bias of spring 48. As the beveled face 49 of end 41 contacts the interior surfaces (not shown) of pieces 45 and 46 these individual pieces are forced laterally against the roof inside holes 26 thereby fixing bolt 39 in hole 26 in a removable manner. When desired to remove bolt 39, the reverse procedure is carried out to remove face 47 from contact with the interior of pieces 45 and 46 so they will no longer be forced against the roof and can be removed from inside hole 26.

Figure 9:
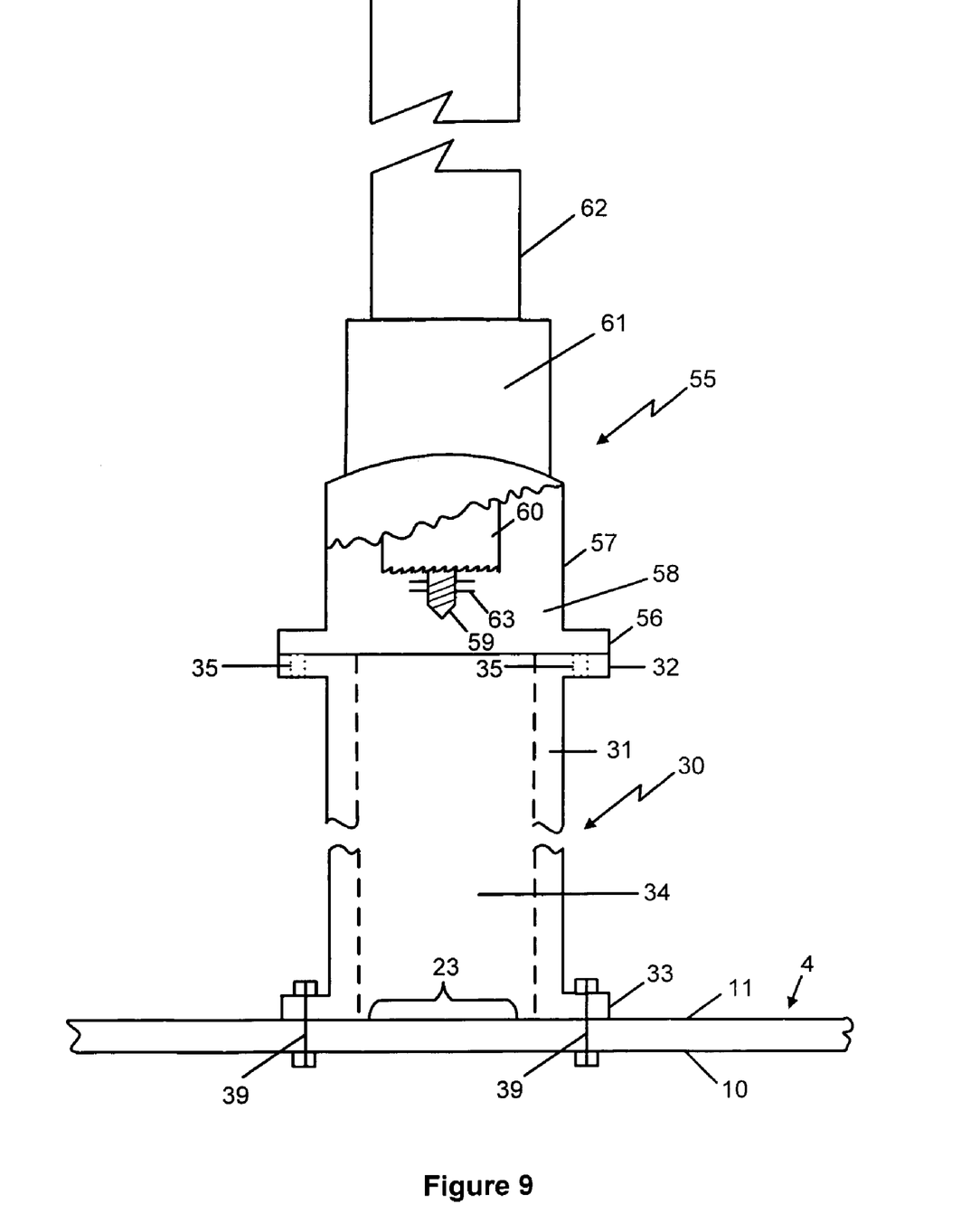
FIG. 9 shows a plan view of a partial cross-section of a drilling means mounted on the flange of FIG. 6 which drilling means is employed to remove a coupon from the tank roof.

FIG. 9 shows the set up of FIG. 6 except that vent 8 is not present because the coupon has not yet been removed from roof 4. Instead, flange 30 carries at its upper end a conventional hot tap machine 55 that is commercially available and well known for other drilling requirements. Such machines are commercially available from suppliers such as T. D. Williams, International Piping Services Company, and TEAM Industrial. Machine 55 has a laterally extending flange member 56 that mates with member 32 and holes 35 so that it can be temporarily be fixed to flange 30 by fasteners (not shown) in the manner shown in FIG. 6 for vent 8. Flange 30 is temporarily fixed to roof 4 by bolts 39 that extend through holes 26 and 37 (not shown, see FIG. 6).

Hot tap machine 55 has a hollow bell container 57 which carries in its open interior 58 a pilot-hole drill bit 59 encompassed by a hole saw bit 60. Both bits are driven by a non-sparking, e.g., pneumatic or hydraulic powered, motor 61. Motor 61 drives an elongate shaft (not shown) that is carried within elongate housing 62 and is fixed to bits 59 and 60 at its lower end. This shaft can be rotated by motor 61 to turn bits 59 and 60 for drilling purposes, and can at the same time be moved longitudinally to drive bits 59 and 60 into contact with and through roof 4 in a conventional drilling manner. Pilot hole drill bit 59 carries a plurality of retainers 63 which can fold into a recess in bit 59 when that bit passes through the pilot hole but is biased by gravity, spring or other means automatically to fold back to the horizontal configuration shown in FIG. 9 thereby to provide a means for retaining the coupon after it is severed from roof 4 and prevent that coupon from falling into the interior of tank 2.

Pilot bit 59 drills a small hole approximately in the center of the desired coupon area 23, and holds larger hollow hole-bit 60 steady as it drills out the larger area coupon that is the same size area as area 23. For example, pilot hole can be 1.25 inches in diameter, while the coupon can be 24 inches in diameter.

When drilling a pilot hole and coupon hole with the equipment of FIG. 9, bits 59 and 60 are contained within the closed interior of flange 30. If refrigeration of the bits is to be employed in addition to cyclic drilling to stay at or below the target temperature aforesaid liquid lubricant together with an antifreeze liquid can be added to the closed interior of flange 30 before drilling of the pilot hole is begun.

Additional lubricant and antifreeze can be added during drilling if desired, but minimal quantities of such materials are desirably used to minimize the contamination of the contents of the tank. Vaporous refrigerant can be introduced into the interior of flange 30 and directed toward the drilling area in any desired manner that will be obvious to one skilled in the art.

Figure 10:
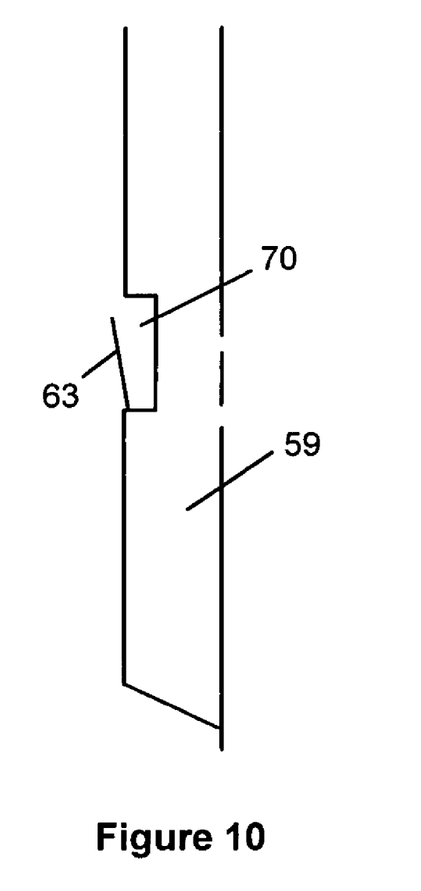
FIGS. 10 and 11 show a partial cross-section of a pilot hole drill bit and its means for retaining the coupon after it is severed from the tank roof, thereby preventing the coupon from falling into the interior of the tank.
Figure 11:
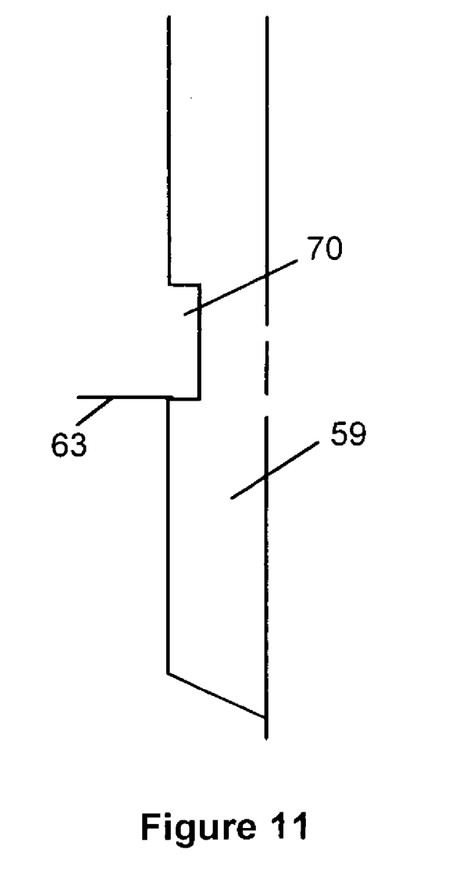

FIG. 10 shows a partial cross-section of pilot bit 59 with its retaining means 63 folded up into recess 70 which is the configuration this assembly would take as bit 59 passes through the pilot hole. Shortly after the portion of bit 59 that carries recess 70 passes through the pilot hole and below lower surface 10 of roof 4, retainer 63, because of its normal bias due to gravity or the like resumes its normal horizontal position that is outside recess 70 and transverse to bit 59 as shown in FIG. 11. If the coupon is just above the retainer shown in FIG. 11 when the coupon is finally completely severed from roof 4, then the coupon will fall down against retainer 63 and be held there, thus preventing the coupon from falling into the interior of the tank.

Figure 12:
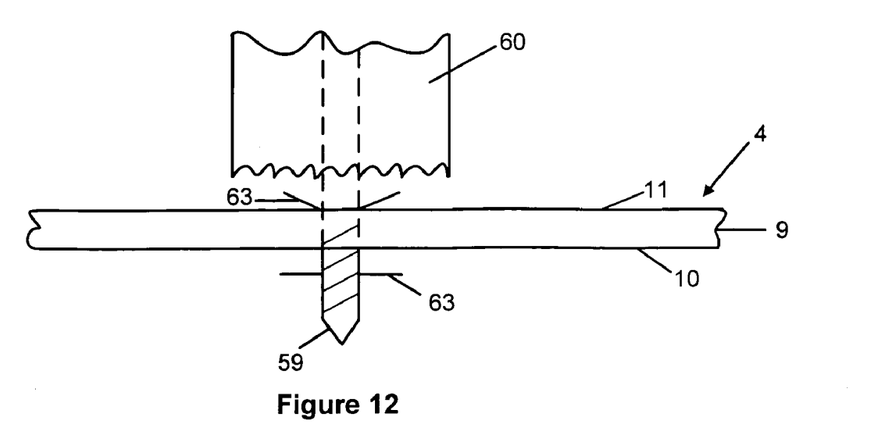
FIG. 12 shows the drilling means of FIG. 9 in operation and drilling a pilot hole.

FIG. 12 shows the process of hot tapping within this invention as the pilot bit penetrates the full thickness 9 of roof 4. Note the retainers 63 that are just entering the pilot hole are more upstanding as they start to meet upper surface 11 of roof 4 and are moving toward the configuration of FIG. 10 so that portion of bit 59 can pass through the pilot hole, whereas the retainers 63 that are below lower surface 10 of roof 4 are in the laterally extended, coupon retaining configuration of FIG. 11.

Figure 13:
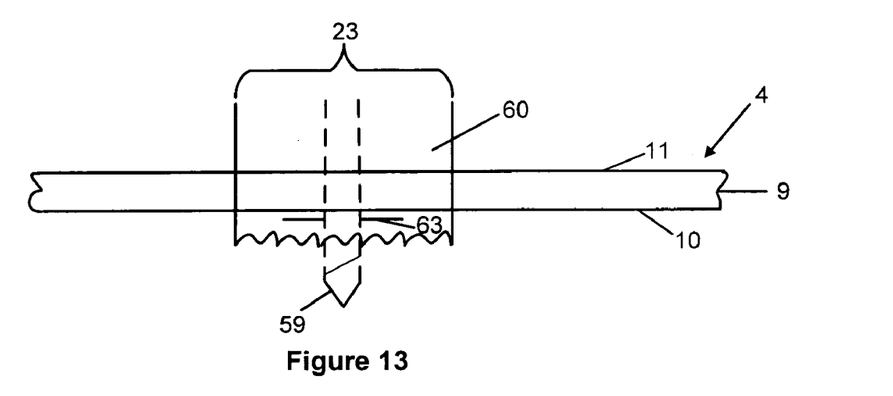
FIG. 13 shows the drilling means of FIG. 9 just after the coupon has been severed from the tank roof.

FIG. 13 shows the drilling of FIG. 12 after drilling has been conducted to an extent that the hole bit has drilled completely through the thickness 9 of roof 4 thereby fully severing the coupon covering area 23 from the roof but just before the now separate coupon falls down into engagement with laterally extending retainers 63 (FIG. 11).

Figure 14:
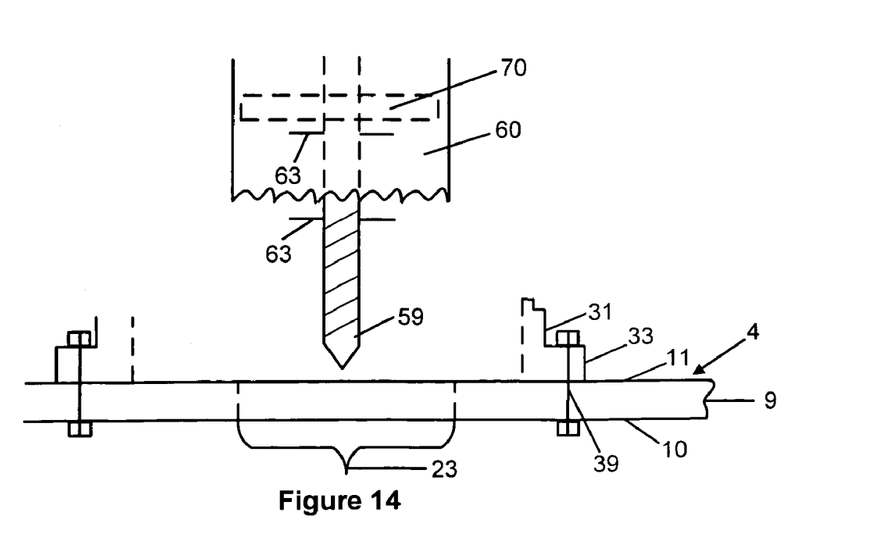
FIG. 14 shows the drilling means of FIG. 9 being removed from the tank roof and carrying the severed coupon with it.

FIG. 14 shows the drilling of FIG. 13 after the severed coupon 70 has been removed from area 23 thereby leaving a hole in roof 4 of the same size as area 23. In FIG. 14 the bit assembly carrying coupon 70 is in the process of being withdrawn into the interior 58 of housing 57 (FIG. 9). Thereafter, hot tap machine 55 is removed from flange 30 and replaced with new vent 8 (FIG. 6). Vent 8 is now in open fluid communication with the interior vapor space 6 of tank 2, such communication being by way of area 23 from which coupon 70 was removed and open interior 34 of flange 30.

EXAMPLE

A carbon steel tank 2 having a roof thickness of about 0.1875 inches, and carrying 50,000 barrels of pyrolysis gasoline is to have a flange 30 and vent 8 attached to its roof without draining the gasoline inventory from the tank. The flange and vent chosen require that a 24 inch diameter coupon be removed from the tank roof. A 1.25 inch diameter pilot hole is to be drilled in the potential coupon area before the 24 inch diameter coupon is drilled out of the tank roof with a hole-saw bit. Seven-eighths inch diameter bolt holes are to be drilled through the roof for fixing the flange to the roof.

The auto-ignition threshold temperature of the specific composition of the pyrolysis gasoline inventory in the tank is determined and a target temperature which is at least less than half of the threshold temperature is chosen. In this example the target temperature is about 150° F.

In mock up trials, segments of carbon steel are drilled using the desired size of bit combinations aforesaid and the same composition steel as that of the tank roof. These trials are carried out to determine a cyclic drilling sequence that will allow drilling fully through the thickness of the roof without exceeding the target temperature. In these trials infrared thermography was employed to determine that:

1) drilling with the ⅞ inch bit would be limited to no more than 10 seconds of continuous drilling during which the bit was to be bathed in vaporized liquid nitrogen at about −20° F., after which drilling would be halted for 30 seconds while the bit was continued to be bathed in vaporized liquid nitrogen to cool same, and this sequence of steps would be used until the full thickness of the roof had been penetrated by the bit, 2) drilling with the pilot bit would also be limited to no more than 10 seconds continuous drilling under a flow of vaporized liquid nitrogen after which a cooling off period of 30 seconds under a continued flow of vaporized liquid nitrogen with no drilling would be employed, and this sequence of steps would be used until the full thickness of the roof had been penetrated by the pilot bit, and 3) drilling with the hole saw bit would be limited to no more than 3 seconds of continuous drilling during which the bit was to be bathed in a flow of vaporized liquid nitrogen, after which drilling would be halted for 30 seconds while the bit was continued to be bathed in vaporized liquid nitrogen to cool same, and this sequence of steps would be used until the full thickness of the roof had been penetrated by the bit and the desired coupon severed from the roof structure.

The desired location for the new vent on the roof is chosen, and a template is employed to drill a series of holes through the roof in the pattern set by the template using the cyclic drilling sequence of 1) above. The pattern of holes thus drilled will encircle the area where the coupon is to be removed from the roof. The pattern will also match the pattern of holes in a flange that is to be attached to the roof.

The template is removed after all pattern holes are drilled and a flange, with appropriate gasket means is set in its place. The flange is fixed to the roof by temporary mechanical bolts.

A commercial worm gear drive hot tap machine is mounted to the top of the flange and the pilot hole drilled using the cyclic drilling sequence of 2) above.

After the pilot hole has been completed and the pilot bit is extended through the roof, the coupon bit is employed to drill out the 24 inch diameter coupon from the roof using the cyclic drilling sequence of 3) above, after which the severed coupon and hot tap machine are removed from the flange.

About 6 ounces of water based drill bit lubricant and antifreeze solution is employed in drilling out the pilot hole and coupon.

Now that access can be had through the 24 inch hole in the roof, the temporary bolts fixing the flange to the roof are removed and replaced by standard threaded bolts that are to be left in place for the duration of operating life. The new vent is then bolted on to the top of the flange.

We claim:

1. In a method for hot tapping equipment composed of a structural material, said structural material having an inner surface that defines and encloses an interior volume of said equipment and an exterior surface exposed to an atmosphere that surrounds said equipment, said structural material having a finite thickness between its inner and outer surfaces, said interior volume containing a fluid that has a chemical composition that is at least one of decomposable and flammable, said equipment being surrounded at least in part by an exterior atmosphere that contains oxygen, the improvement comprising determining an area of said equipment for the removal of a coupon from the full thickness of said structural material by hot tapping thereby to expose said interior volume to said surrounding atmosphere by way of the area exposed by the removal of said coupon, based on the chemical composition of said fluid determining a target temperature which is the maximum temperature said structural material will reach during said hot tapping, drilling with a drill means carrying a drill bit a pilot hole in the area where said coupon is to be removed, said drill means carrying a coupon retaining means, said pilot hole drilling being accomplished without exceeding said target temperature by employing at least one of cyclic drilling composed of alternate periods of drilling and non-drilling and refrigeration, after said pilot hole is drilled and said drill bit extends through said structural material and said retaining means is in place to catch and support said coupon after severance of same from said equipment drilling said coupon out of said structural material, said coupon drilling being accomplished without exceeding said target temperature by employing said at least one cyclic drilling and refrigeration, and removing said coupon whereby said interior volume is exposed to said atmosphere.

2. The method of claim 1 wherein said method is carried out with no welding step.

3. The method of claim 1 wherein said inner surface of said structural material that is exposed to said interior volume of said equipment does not exceed said target temperature.

4. The method of claim 1 wherein said drill means is non-sparking.

5. The method of claim 1 wherein said coupon retaining means is at least one member carried by said drill bit and biased normally to extend laterally from said bit after passing through said structural material to receive and hold said coupon after said coupon is fully severed from said structural material.

6. The method of claim 1 wherein said cyclic drilling is composed of alternate time periods of drilling and not drilling to allow cooling of said bit and structural material being drilled so that the temperature of said structural material being drilled does not exceed said target temperature.

7. The method of claim 1 wherein refrigeration is provided during said cyclic drilling of at least one of said pilot hole and said coupon by bathing at least one of said bit and structural material being drilled with a cold fluid.

8. The method of claim 7 wherein a drilling lubricant and antifreeze solution is employed during drilling.

9. The method of claim 7 wherein said cold fluid is at least one of liquid nitrogen, argon, ammonia, and freon.

10. The method of claim 1 wherein a plurality of holes are drilled around the periphery of said coupon area using said cyclic drilling, and a flange means is mechanically fixed to said exterior surface of said equipment surrounding said coupon area after which said drill means is mounted on said flange means and said coupon is drilled out within the enclosure of said flange means.

* * * * *